US012801408B2

(12) United States Patent
Aalto et al.

(10) Patent No.: US 12,801,408 B2
(45) Date of Patent: Nov. 17, 2026

(54) COMPUTER-IMPLEMENTED METHOD AND COMPUTING SYSTEM FOR MOVING DIGITAL OBJECT ON USER INTERFACE

(71) Applicant: Supercell Oy, Helsinki (FI)

(72) Inventors: Markus Aalto, Helsinki (FI); Jonas Collaros, Helsinki (FI); Tommi Suvinen, Helsinki (FI); Tristan Williams, Helsinki (FI); Antti Takala, Helsinki (FI)

(73) Assignee: Supercell Oy, Helsinki (FI)

( * ) Notice: Subject to any disclaimer, the term of this patent is extended or adjusted under 35 U.S.C. 154(b) by 283 days.

(21) Appl. No.: 18/668,931

(22) Filed: May 20, 2024

(65) Prior Publication Data

US 2025/0355679 A1 Nov. 20, 2025

(51) Int. Cl.
*G06Q 10/047* (2023.01)
*G06F 9/451* (2018.01)

(52) U.S. Cl.
CPC .......... *G06F 9/451* (2018.02); *G06Q 10/047* (2013.01)

(58) Field of Classification Search
CPC ............................. G06F 9/451; G06Q 10/047
See application file for complete search history.

(56) References Cited

U.S. PATENT DOCUMENTS

2022/0176250 A1 6/2022 Teng et al.
2023/0367463 A1* 11/2023 Pasula .................... A63F 13/56
2024/0091645 A1* 3/2024 Hu ....................... A63F 13/537
2024/0261684 A1* 8/2024 Cai ....................... A63F 13/69

OTHER PUBLICATIONS

Mario Pagan et al., A Security-Enhanced Routing Algorithm with Path Randomization, Feb. 1, 2015, International Workshop on Sensor, Peer-to-peer and Social Networks, pp. 1137-1141 (Year: 2015).*

Chi-Hieu Nguyen et al., Efficient Landmark-based Compact Routing for Random Interconnection Topologies, Mar. 1, 2019, IEEE International Conference on Research—Innovation and Vision for the Future, pp. 1-6 (Year: 2019).*

European Patent Office, International Search Report and and Written Opinion, Application No. PCT/FI2025/050201, mailed Jul. 16, 2025, 11 pages.

* cited by examiner

*Primary Examiner* — Tam T Tran
(74) *Attorney, Agent, or Firm* — ZIEGLER IP LAW GROUP, LLC.

(57) ABSTRACT

Disclosed is a computer-implemented method for moving a digital object on a user interface, executed on a computing system, with a processor, memory and the user interface. The method includes executing instructions stored in the memory for receiving a user input indicating a first location at the user interface; rendering, at the first location of the user interface the digital object; determining a location of two or more targets at the user interface; determining route distances from the first location of the digital object to the locations of each target; obtaining randomized route distances by randomizing the determined route distances; selecting as a target location for the digital object, out of the two or more targets, a target which has shortest randomized route distance among the adjusted route distances and moving the digital object, along a route from the first location towards the location of the target location.

8 Claims, 6 Drawing Sheets

COMPUTER-IMPLEMENTED METHOD AND COMPUTING SYSTEM FOR MOVING DIGITAL OBJECT ON USER INTERFACE

TECHNICAL FIELD

The present disclosure relates to computer-implemented methods for moving digital objects on user interfaces. Moreover, the present disclosure relates to computing systems for moving digital objects on user interfaces.

BACKGROUND

Typically, computing applications involve movement of a graphical object from an initial position to a final position on a user interface. However, in many scenarios, the movement of the graphical object is predictable, i.e., the final location towards which the graphical object is going to move can be simulated and determined from amongst a plurality of possible final locations, even before the graphical object starts to move towards the final location. Thus, these computing applications become deterministic in nature.

As a result, these computing applications become prone to fraudulent activities as users can simulate and predict the movement of the graphical object in different scenarios beforehand, and thus, gain an unfair advantage over other users. Moreover, a working of these computing applications becomes predictable and less engaging over time, which reduces a number of users using these computing applications.

Therefore, in light of the foregoing discussion, there exists a need to overcome the aforementioned drawbacks.

SUMMARY

The aim of the present disclosure is to provide a computer-implemented method and a computing system to prevent simulation of movement of a digital object on a user interface. The aim of the present disclosure is achieved by a computer-implemented method and a computing system for moving a digital object on a user interface as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
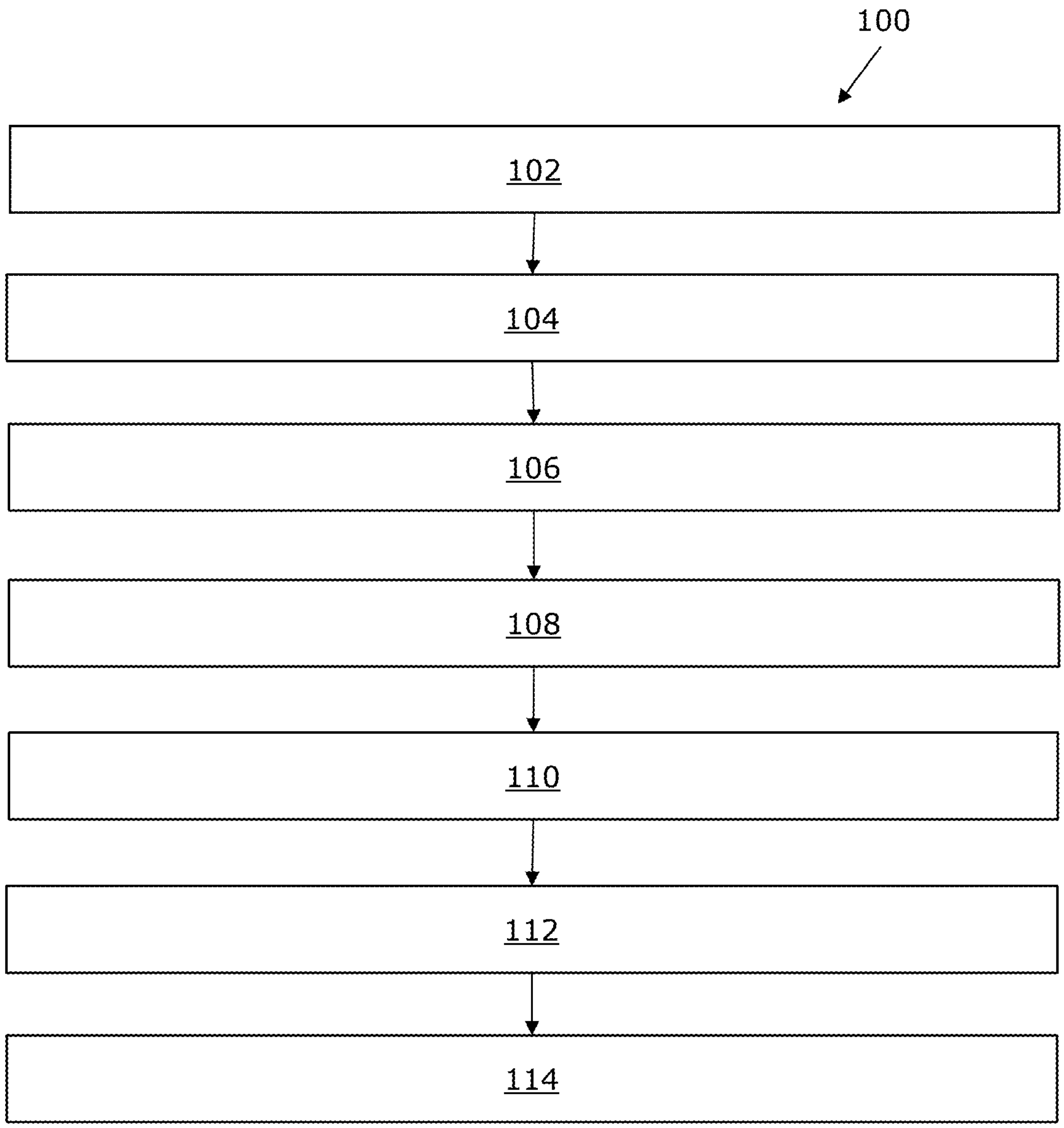
FIG. 1 is an illustration of a flowchart depicting steps for a computer-implemented method for moving a digital object on a user interface, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a computer-implemented method for moving a digital object on a user interface, executed on a computing system, comprising a processor, memory and the user interface, the method comprising instructions stored in the memory for:

- receiving a user input indicating a first location at the user interface;
- rendering, at the first location of the user interface, the digital object;
- determining a location of each of two or more targets at the user interface;
- determining route distances from the first location of the digital object to the location of each of the two or more targets;
- obtaining randomized route distances by randomizing the determined route distances;
- selecting as a target location for the digital object, out of the two or more targets, the location of a target which has a shortest randomized route distance amongst the randomized route distances; and
- moving the digital object along a route from the first location towards the target location.

The use of randomized route distances for selecting the target location for the digital object significantly reduces a predictability in moving the digital object. Moreover, a computing application for which the computer-implemented method is executed, is made less prone to fraudulent activities as the predictability in moving the digital object is reduced. Furthermore, increase in unpredictability and randomness in moving the digital object provides a more engaging experience of using the computing application to a user. This can be useful for example in context of computer games, traffic simulations, arranging objects and a like. In deed as an example if the digital object is a game character the movement of the game character can be made less predictable with this randomized route distance selection. In traffic simulation applications the benefit is possibility to simulate different scenarios with one input type (i.e. placing for example a symbol of vehicle in one place and then randomizing its routes to simulate different route options).

In a second aspect, the present disclosure provides a computing system for moving a digital object on a user interface, the computing system comprising means for carrying out the method of a first aspect.

The use of randomized route distances to select the target location for the digital object significantly reduces a predictability in movement of the digital object. Moreover, a computing application for which the computer-implemented method is executed, is made less prone to fraudulent activities as the predictability in moving the digital object is reduced. Furthermore, increase in unpredictability and randomness in the movement of the digital object provides a more engaging experience of using the computing application to a user. It also provides efficient way to simulate different scenarios for planning purposes or for example for training purposes.

Throughout the present disclosure, the term "user interface" refers to a space where interaction between a user and a display screen of the computing system occurs, where the interaction between the user and the display screen of the computer screen is related to a computing application that is implemented on the computing system. Typically, the user interface presents one or more spatially distributed elements on the display screen of the computing system. Beneficially, the interaction between the user and the display screen of the computing system allows effective operation and control of the computing application. Moreover, the user interface is designed to allow the user to interact easily, efficiently, and in a user-friendly manner with the computing system to provide maximum usability, thereby reducing an amount of user input to achieve a desired output.

Typically, the user interface may be composed of one or more layers, including a human-machine interface (HMI) that interfaces machines with physical input hardware such as keyboards, a mouse, a touch screen or a game pad; and output hardware such as a computer monitor, a speaker, a printer, and the like. Moreover, a user interface layer may interact with one or more human senses, and may comprise at least one of: tactile user interface (touch), visual user interface (sight), auditory user interface (sound), olfactory user interface (smell), equilibria user interface (balance), gustatory user interface (taste). Herein, the user interface is composed of the visual user interface and the tactile user interface to display graphics and receive user inputs, respectively. Moreover, the aforementioned user interface, when sound is added to the user interface, becomes a multimedia user interface (MUI).

Herein, the user interface is such that the digital object is being displayed to the user via the display screen of the computing system. Throughout the present disclosure, the term "digital object" refers to a computer generated entity which is designed to perform specific actions or serve specific purposes in the computing application being implemented on the computing system. Optionally, the digital object resembles one of: a human, an animated character, user interface element, game element, and the like. It will be appreciated that the digital object moves from one position to another position in the computing application. Subsequently, the movement of the digital object in the computing application is depicted to the user on the user interface.

Notably, the computer-implemented method provides steps for enabling and controlling the movement of the digital object on the user interface for the computing application that is implemented on the computing system. Subsequently, steps of the computer-implemented method are executed on the computing system in which the computing application is being implemented. The computing system comprises a processor, wherein the processor of the computing system is used to execute the steps of the method. Throughout the present disclosure, the term "processor" refers to a computational element that is operable to execute the software framework. Examples of the processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, one or more individual processors, processing devices and elements are arranged in various architectures for responding to and processing the instructions that execute the software framework.

Moreover, the computing system comprises the memory. The memory is configured to store the instructions of the computer-implemented method executable by the processor. Examples of implementation of the memory may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The method comprises instructions stored in the memory for receiving the user input indicating the first location at the user interface. Throughout the present disclosure, the term "user input" refers to an input given by the user that enables the user to interact with the computing application and indicate the first location at the user interface. Optionally, the user input is received from the user via a tap of finger over the display screen, where the display screen is in the form of a touch screen. Alternatively, the user input is received from the user via a mouse click. In an implementation, where the user is an automated software application used for simulation purposes, the user input is received from the automated software application itself along with specifying the first location as well. Throughout the present disclosure, the term "first location" refers to a starting position and/or orientation on the user interface at which the user wants the digital object to be appear in the computing application. Notably, the receiving of the user input enables the computing application to know exact coordinates of the first location in the computing where the user wants the digital object to appear at.

Moreover, the method comprises instructions stored in the memory for rendering, at the first location of the user interface, the digital object. Herein, rendering the digital object at the first location of the user interface relates to displaying the digital object on the user interface such that the digital object appears to be exactly at the first location which is provided by the user via the user input. Notably, rendering techniques for rendering the digital object at the first location of the user interface are well-known in the art.

Furthermore, the method comprises instructions stored in the memory for determining the location of each of two or more targets at the user interface. Throughout the present disclosure, the term "targets" refers to those possible locations on the user interface towards which the digital object might move. It will be appreciated that the location of the two or more targets are determined based on a role or action that is to be performed by the digital object in the computing application. Notably, determining the location of the two or more targets relates to determining specific coordinates in the user interface for each of the two or more targets. For example, the location of the target 1, target 2 and target 3 is determined to be point A, point B and point C, respectively, at the user interface.

Optionally, the method further comprises defining a bounding region around each of the two or more targets, wherein each of the bounding regions comprise edges, wherein each edge having two or more sample points distributed randomly along each edge. Throughout the present disclosure, the term "bounding region" refers to a region enclosed within a closed boundary that is virtually drawn around the given target from amongst the two or more targets. Optionally, each of the bounded regions is in shape of a polygon such as one of: a square, a rectangle, a triangle, a circle, and the like. Subsequently, each of the bounding region comprises a fixed number of edges, based on the shape of each of the bounding regions. Throughout the present disclosure, the term "sample point" refers to a possible location on a given edge of the given bounding region around the given target, towards which the digital objects moves for moving towards the given target. Notably, each edge of the given bounding region around the given target has two or more sample points, which implies that there are two or more possible locations on each edge towards which the digital object may move for moving towards the location of the given target. A technical effect is that there are plurality of locations for the given target in form of two or more sample points along each edge towards which the digital object may move for moving to the location of the given target.

Furthermore, the method comprises instructions stored in the memory for determining the route distances from the first location of the digital object to the location of each of the two or more targets. Throughout the present disclosure, the term "route distance" refers to a distance that needs to be covered by the digital object while moving from the first location to the location of a given target. Notably, the route distances comprises a separate route distance determined separately for each of the two or more targets from the first location of the digital object. The route distance for the given target is determined by calculating a pixel length of a route between the first location of the digital object and the location of the given target. Notably, the route distances are determined in terms of pixels. For example, the route distances from the first location of the digital object to the point A, point B and point C, respectively, are determined to be 5 pixels, 7 pixels and 10 pixels, respectively. It will be appreciated that determining the route distances enables to determine how far the location of any of the two or more targets is from the first location of the digital object in comparison to how far the locations of other two or more targets are from the first location of the digital object.

Optionally, determining the route distances from the first location of the digital object to the location of each of the two or more targets comprises determining routes from the first location to a random sample point from amongst the two or more sample points of each of the edges of the bounding regions for each of the two or more targets. Notably, the random sample point for each of the two or more targets is selected based on an orientation at which the digital object is supposed to reach each of the two or more targets. It will be appreciated that determining the routes from the first location to the random sample point for each of the two or more targets, enables to calculate the distance that needs to be travelled by the digital object from the first location to the random sample point for each of the two or more targets in terms of pixel length, and subsequently, the route distances are from the first location of the digital object to the location of each of the two or more targets determined. A technical effect is that the route distances are effectively and accurately determined in scenarios when the digital object has to move from the first location the random sample point from amongst the two or more sample points of each of the edges of the bounding regions for each of the two or more targets.

Optionally, the method further comprises detecting a presence of static graphical objects along the determined routes and adjusting the determined route distances based on distances needed to avoid the static graphical objects. Throughout the present disclosure, the term "static graphical objects" refers to virtual entities (such as persons or obstacles) that lie in the determined routes of the digital object from the first location to the two or more targets. Notably, the determined routes are to be adjusted so that the determined routes bypass the static graphical objects to avoid the digital object to appear as if colliding with the static graphical objects while moving towards the two or more targets. Subsequently, the determined route distances are accordingly adjusted to accumulate the adjustment in the determined routes to avoid collision with the static graphical objects. A technical effect is that that the determined route distances are effectively adjusted for avoiding collision of the digital object with the static graphical objects and providing glitch free visual experience to the user on the user interface.

Furthermore, the method comprises instructions stored in the memory for obtaining the randomized route distances by randomizing the determined route distances. Herein, randomizing the determined route distances relates to adjusting an actual value of each determined route distance to a random value. Throughout the present disclosure, the term "randomized route distances" refers to those corresponding values of the determined route distances obtained after randomizing the determined route distances. For example, the determined route distances of 5 pixels, 7 pixels, and 10 pixels are randomized to obtain the randomized route distances of 9 pixels, 6 pixels and 8 pixels, respectively for target 1, target 2, and target 3, respectively. Optionally, the determined route distances are randomized using a mathematical equation, where determined route distances are used as inputs for the mathematical equation and corresponding outputs of the mathematical equation are obtained as randomized route distances. Alternatively, the determined route distances are randomized by altering the routes between the first location of the digital object and the location of each of the two or more targets which are used to determine the route distances. It will be appreciated that obtaining the randomized route distances create an unpredictable order of how far the location of each of the two or more targets is from the first location of the digital object. This is also beneficial for simulating different digital object movement scenarios (such as when analyzing playability of a game or analyzing traffic jams).

Optionally, the randomized route distances are determined by adjusting the determined route distances by predetermined random distances. Throughout the present disclosure, the term "predetermined random distance" refers to a numerical value that is used to adjust the given determined route distance from amongst the determined route distances. Notably, each randomized route distance is determined by adjusting a corresponding determined route distance by a corresponding predetermined random distance. Optionally, each determined route distance is adjusted by the corresponding predetermined random distance by one of: addition, subtraction, multiplication, division and the like of the corresponding predetermined random distance with the each determined route distance. A technical effect is that the randomized route distances are effectively determined in an unpredictable manner. As an one example each determined route distances can be multiplied with random number of 0.8 to 1.2, 0.9 to 1.1 or 0.94 to 1.05.

Furthermore, the method comprises instructions stored in the memory for selecting as the target location for the digital object, out of the two or more targets, the location of the target which has the shortest randomized route distance amongst the randomized route distances. Throughout the present disclosure, the term "target location" refers to the location of a given target selected from amongst the two or more targets towards which the digital object is to move. Notably, a criteria that is used to determine the target whose location is selected as the target location, is to determine which is the target from amongst the two or more targets that has a lowest value of the randomized route distance (i.e., shortest randomized route distance) in comparison to remaining of the randomized route distances. For example, the randomized route distances for target 1, target 2, and target 3 are 9 pixels, 6 pixels and 8 pixels, respectively, then the location of the target 2 at point B is selected as target location towards which the digital object has to move, as the location of the target 2 has the shortest randomized route distance. Notably, using the randomized route distances for selecting the target location ensures that selection of the target location is kept unpredictable for anyone except the computing application, as the randomized route distances which are used to select the target location are not known to anyone except the computing application.

Furthermore, the method comprises instructions stored in the memory for moving the digital object along the route from the first location towards the target location. Herein, the digital object is rendered in the user display to appear as if the digital object is moving from the first location towards the target location. Notably, the movement of the digital object is displayed on the user interface such that a glitch free and immersive visual experience is provided to the user.

The present disclosure also relates to the computing system as described above. Various embodiments and variants disclosed above, with respect to the aforementioned computer-implemented method, apply mutatis mutandis to the computing system.

The present disclosure also relates to the computer program as described above. Various embodiments and variants disclosed above, with respect to the aforementioned computer-implemented method and the aforementioned computing system, apply mutatis mutandis to the computer program.

The present disclosure also relates to the computer-readable storage medium as described above. Various embodiments and variants disclosed above, with respect to the aforementioned computer-implemented method, the aforementioned computing system and the aforementioned computer program, apply mutatis mutandis to the computer-readable storage medium.

DETAILED DESCRIPTION OF THE DRAWINGS

Referring to FIG. 1, illustrated is a flowchart 100 depicting steps for a computer-implemented method for moving a digital object on a user interface, in accordance with an embodiment of the present disclosure. At step 102, a user input indicating a first location at the user interface, is received. At step 104, at the first location of the user interface, the digital object is rendered. At step 106, a location of each of two or more targets at the user interface is determined. At step 108, route distances are determined from the first location of the digital object to the location of each of the two or more targets. At step 110, randomized route distances are obtained by randomizing the determined route distances. At step 112, out of the two or more targets, the location of a target which has a shortest randomized route distance amongst the randomized route distances, is selected as a target location for the digital object. At step 114, the digital object is moved along a route from the first location towards the target location.

Figure 2A:
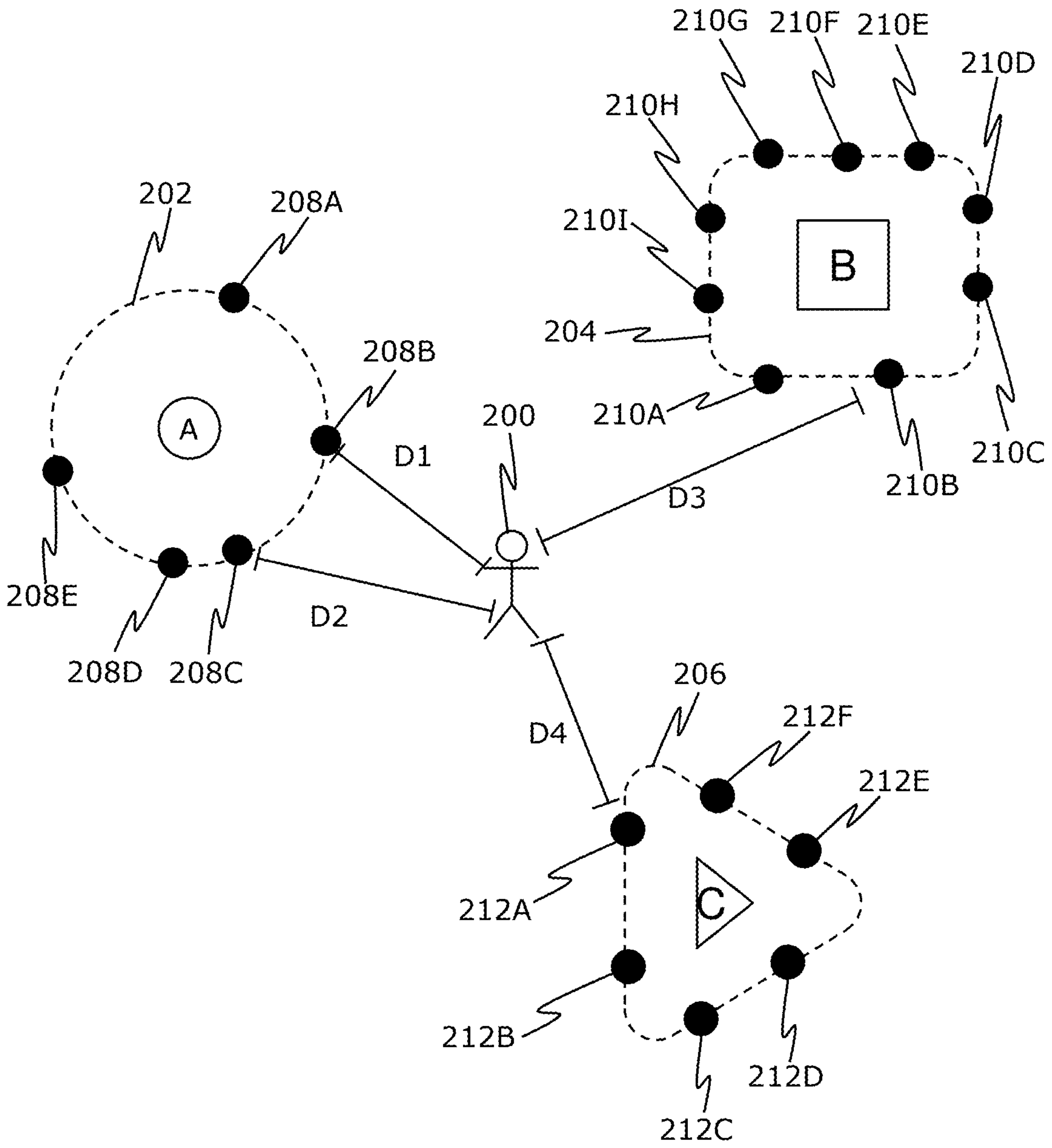
FIG. 2A and FIG. 2B are schematic illustrations of determined route distances of a digital object in different implementation scenarios, in accordance with an embodiment of the present disclosure.
Figure 2B:
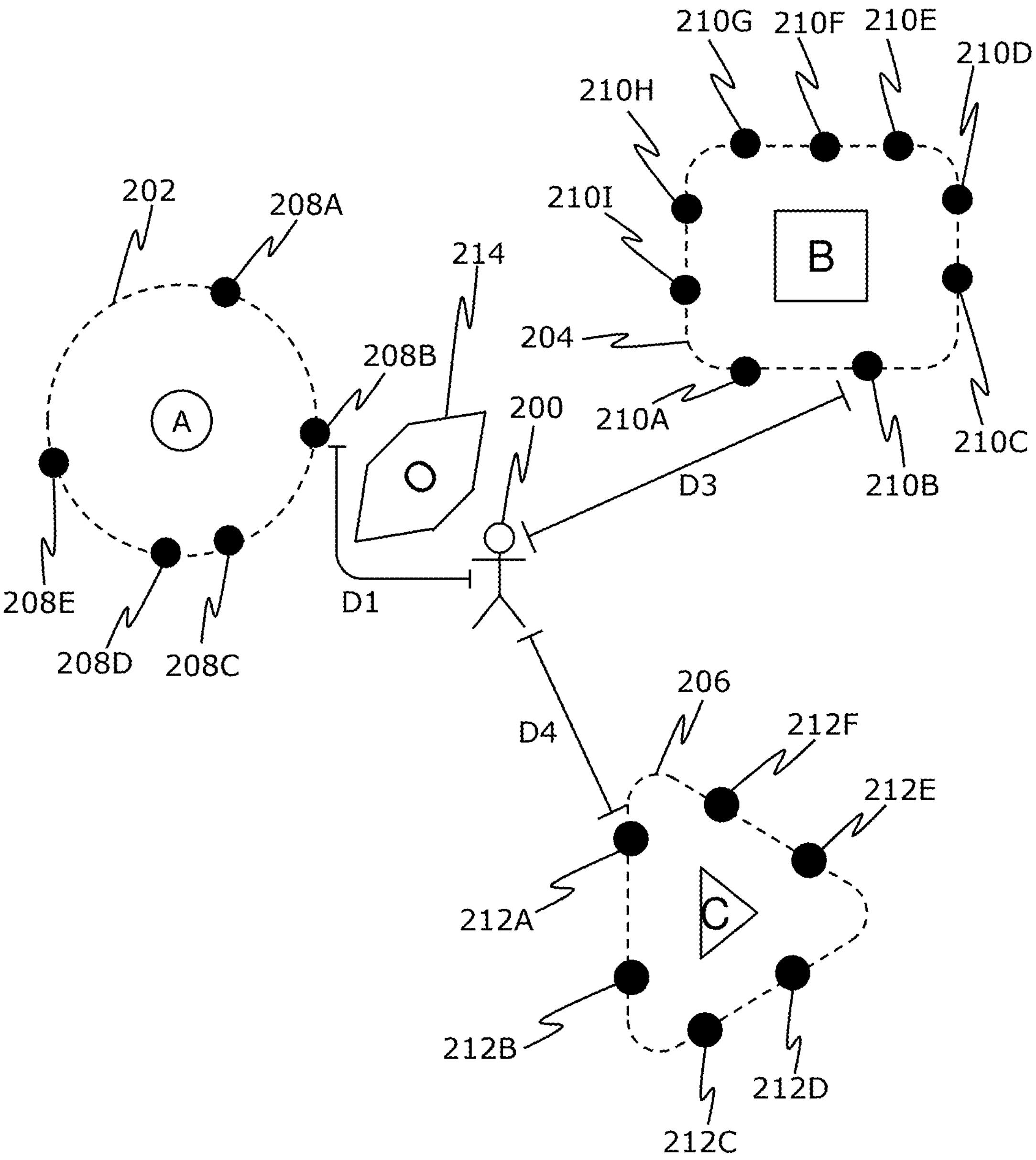

Referring to figures FIG. 2A and FIG. 2B, illustrated are schematic illustrations of determined route distances of a digital object 200 in different implementation scenarios, in accordance with an embodiment of the present disclosure. As shown in FIG. 2A, a location of each of two or more targets (depicted as targets A-C) is determined, wherein a bounding region 202 is defined around the target A, a bounding region 204 is defined around the target B, and a bounding region 206 is defined around the target C. Herein, the bounding region 202 has sample points 208A-E, the bounding region 204 has sample points 210A-I, the bounding region C has sample points 212A-F. Subsequently, a route distance D1 is determined from a first location to a location of the sample point 208B, a route distance D2 is determined from the first location to a location of the sample point 208C, a route distance D3 is determined from the first location to a location of the sample point 210B, a route distance D4 is determined from the first location to a location of the sample point 212A. As shown in FIG. 2B, presence of a static graphical object 214 is detected. Subsequently, the route distance D1 is adjusted based on a distance needed to avoid the static graphical object 214.

Figure 3:
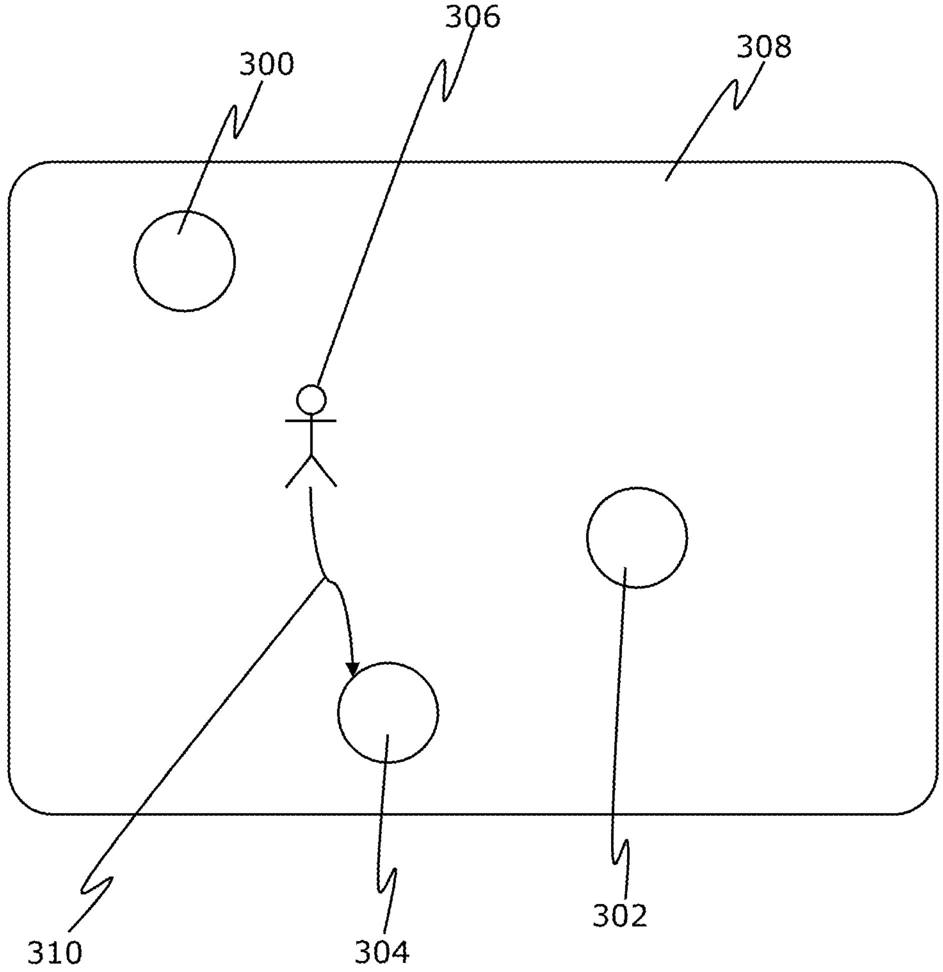
FIG. 3 is a schematic illustration of a target with shortest randomized route distance being selected as a target location, in accordance with an embodiment of the present disclosure.

Referring to FIG. 3, illustrated is a schematic illustration of selection of a location of a target with shortest randomized route distance as a target location, in accordance with an embodiment of the present disclosure. As shown, two or more targets (depicted as target 300, target 302 and target 304) are determined for a digital object 306 at a user interface 308, wherein randomized route distances are determined from a first location of the digital object 306 to a location of the target 300, the target 302, and the target 304, respectively. Subsequently, the randomized route distance for the target 304 is determined to be the shortest randomized route distance, and thus, the location of the target 304 is selected as the target location. Notably, the randomized route distance for the target 304 is determined using a route 310 between the first location of the digital object 306 and the location of the target 304.

Figure 4:
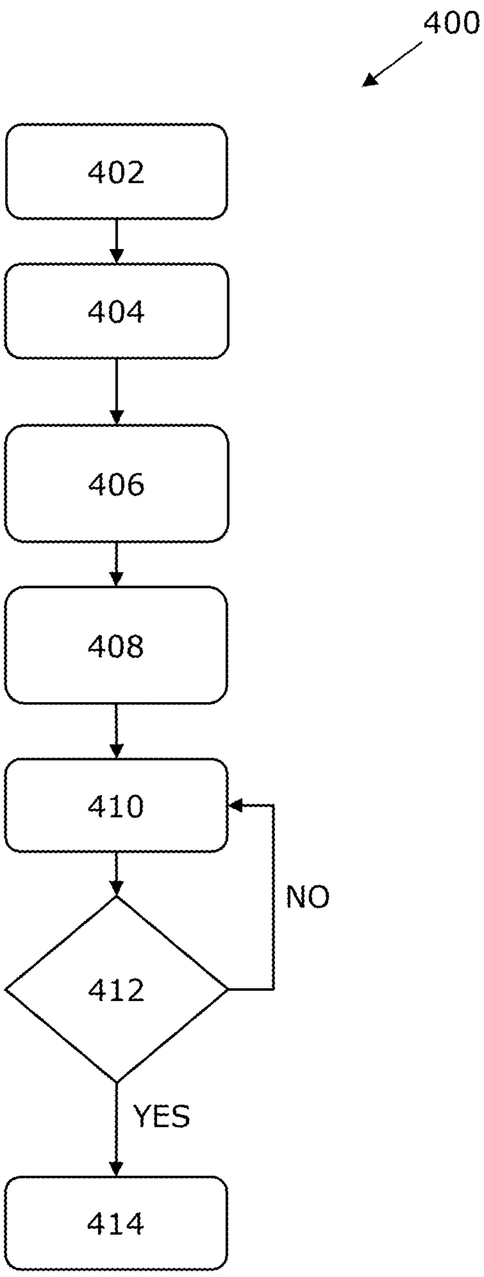
FIG. 4 is an illustration of a flowchart depicting steps for an implementation of a computer-implemented method for moving a digital object on a user interface, in accordance with an embodiment of the present disclosure.

Referring to FIG. 4, illustrated is a flowchart 400 depicting steps for an implementation of a computer-implemented method for moving a digital object on a user interface, in accordance with an embodiment of the present disclosure. At step 402, two or more targets are rendered on a user interface. At step 404, a digital object is rendered at a first location on the user interface. At step 406, route distances are determined from the first location of the digital object to a location of each of the two or more targets. At step 408, randomized route distances are obtained by randomizing the determined route distances. At step 410, a given target is selected from amongst the two or more targets. At step 412, the randomized route distance of the given target is checked to determine if the randomized route distance of the given target is a shortest randomized route distance. If the randomized route distance of the given target is determined as the shortest randomized route distance, then at step 414, a location of the given target is selected as the target location and the digital object is moved from the first location to the target location. If the randomized route distance of the given target is not determined as the shortest randomized route distance, then another target from amongst the two or more targets is selected as the given target and the step 412 is repeated.

Figure 5:
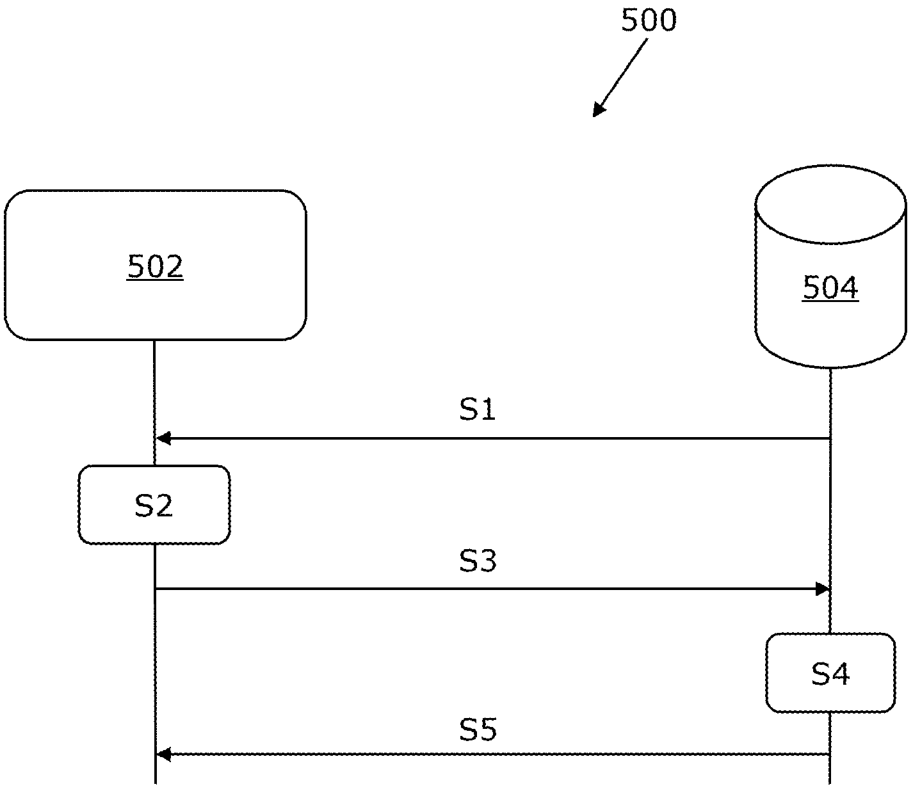
FIG. 5 is an illustration of a process flow depicting steps for an implementation of a computer-implemented method for moving a digital object on a user interface, in accordance with an embodiment of the present disclosure.

Referring to FIG. 5, illustrated is a process flow depicting steps for an implementation of a computer-implemented method for moving a digital object on a user interface, in accordance with an embodiment of the present disclosure. At step S1, a computing system 502 in which the computer-implemented method is being executed, receives data from a server arrangement 504 for rendering two or more targets on a user interface of the computing system. Optionally, the computing system 500 receives a complete software data or a partial software data related to a computing application for which the computer-implemented method is being implemented, from the server arrangement 504. At step S2, a user input indicating a first location of a digital object is received from a user. At step S3, data related to the first location and route distances determined from the first location to a location of each of the two or more targets is sent from the computing system 502 to the server arrangement 504. At step S4, the determined route distances are randomized by the to determine randomized route distances for each of the two or more targets, and subsequently, the location of the target which has the shortest randomized route distance from the first location is selected as the target location. At step S5, the target location is sent from the server arrangement 504 to the computing system 502 and subsequently, the digital object is moved from the first location to the target location.

Figure 6:
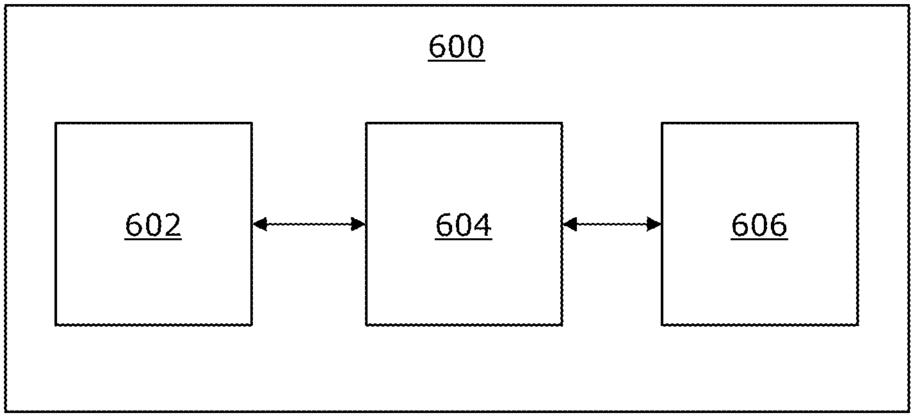
FIG. 6 is an illustration of a block diagram of a computing system for moving a digital object on a user interface, in accordance with an embodiment of the present disclosure.

Referring to FIG. 6, illustrated is a block diagram of a computing system 600 for moving a digital object on a user interface 602, in accordance with an embodiment of the present disclosure. As shown, the computing system comprises the user interface 602, a processor 604, and a memory 606. The processor 604 is communicably coupled with the user interface 602. Similarly, the processor 604 is communicably coupled with the memory 606. Herein, the memory 606 is configured to store instructions of a computer-implemented method that is executed on the computing system 600. Moreover, the processor 604 is configured to execute the instructions of the computer-implemented method.

The invention claimed is:

1. A computer-implemented method for moving a digital object on a user interface, executed on a computing system, comprising a processor, memory and the user interface, the method comprising executing instructions stored in the memory for:
- receiving a user input indicating a first location at the user interface;
- rendering, at the first location of the user interface, the digital object;
- determining a location of each of two or more targets at the user interface;
- determining route distances from the first location of the digital object to the location of each of the two or more targets;
- obtaining randomized route distances by randomizing the determined route distances;
- selecting as a target location for the digital object, out of the two or more targets, the location of a target which has a shortest randomized route distance amongst the randomized route distances; and
- moving the digital object along a route from the first location towards the target location.

2. The method according to claim 1, wherein the method further comprises defining a bounding region around each of the two or more targets, wherein each of the bounding regions comprise edges, wherein each edge having two or more sample points distributed randomly along each edge.

3. The method according to claim 2, wherein determining the route distances from the first location of the digital object to the location of each of the two or more targets comprises determining routes from the first location to a random sample point from amongst the two or more sample points of each of the edges of the bounding regions for each of the two or more targets.

4. The method according to claim 1 wherein the randomized route distances are determined by adjusting the determined route distances by predetermined random distances.

5. The method according to claim 1, wherein the method further comprises detecting a presence of static graphical objects along the determined routes and adjusting the determined route distances based on distances needed to avoid the static graphical objects.

6. A computing system for moving a digital object on a user interface, the computing system comprising a processor configured to cause the computing system to:
- receive a user input indicating a first location at the user interface;
- render, at the first location of the user interface, the digital object;
- determine a location of each of two or more targets at the user interface;
- determine route distances from the first location of the digital object to the location of each of the two or more targets;
- obtain randomized route distances by randomizing the determined route distances;
- select as a target location for the digital object, out of the two or more targets, the location of a target which has a shortest randomized route distance amongst the randomized route distances; and
- move the digital object along a route from the first location towards the target location.

7. A computer program product for moving a digital object on a user interface, the computer program product embodied on a non-transitory computer readable medium comprising instructions which, when the program is executed by a computing system, cause the computing system to:
- receive a user input indicating a first location at the user interface;
- render, at the first location of the user interface, the digital object;
- determine a location of each of two or more targets at the user interface;
- determine route distances from the first location of the digital object to the location of each of the two or more targets;
- obtain randomized route distances by randomizing the determined route distances;
- select as a target location for the digital object, out of the two or more targets, the location of a target which has a shortest randomized route distance amongst the randomized route distances; and
- move the digital object along a route from the first location towards the target location.

8. A non-transitory computer-readable storage medium comprising instructions which, when executed by a computing system, cause the computing system to;
- receive a user input indicating a first location at the user interface;

render, at the first location of the user interface, the digital object;

determine a location of each of two or more targets at the user interface;

determine route distances from the first location of the digital object to the location of each of the two or more targets;

obtain randomized route distances by randomizing the determined route distances;

select as a target location for the digital object, out of the two or more targets, the location of a target which has a shortest randomized route distance amongst the randomized route distances; and move the digital object along a route from the first location towards the target location.

* * * * *